(12) United States Patent
Shaffer

(10) Patent No.: US 12,124,295 B2
(45) Date of Patent: Oct. 22, 2024

(54) MOUNT FOR A COMPUTING DEVICE

(71) Applicant: NewPower, Inc., Riverside, CA (US)

(72) Inventor: Thomas Shaffer, Murietta, CA (US)

(73) Assignee: NEWPOWER, INC., Riverside, CA (US)

( * ) Notice: Subject to any disclaimer, the term of this patent is extended or adjusted under 35 U.S.C. 154(b) by 0 days.

(21) Appl. No.: 17/246,499

(22) Filed: Apr. 30, 2021

(65) Prior Publication Data
US 2021/0341968 A1 Nov. 4, 2021

Related U.S. Application Data

(60) Provisional application No. 63/018,211, filed on Apr. 30, 2020.

(51) Int. Cl.
*G06F 1/16* (2006.01)
*B25J 11/00* (2006.01)
*G06F 3/04883* (2022.01)

(52) U.S. Cl.
CPC ......... *G06F 1/1632* (2013.01); *B25J 11/0005* (2013.01); *B25J 11/001* (2013.01); *G06F 1/1639* (2013.01); *G06F 1/1652* (2013.01); *G06F 3/04883* (2013.01)

(58) Field of Classification Search
CPC .... G06F 1/1632; G06F 1/1639; G06F 1/1652; G06F 3/04883; G06F 1/1607; G06F 1/1626; G06F 1/1643; B25J 11/0005; B25J 11/001; B25J 11/00; F16M 11/22; F16M 11/42
See application file for complete search history.

(56) References Cited

U.S. PATENT DOCUMENTS

| | | | | |
|---|---|---|---|---|
| 8,836,751 | B2* | 9/2014 | Ballantyne | H04N 7/142 348/14.05 |
| 10,032,325 | B1* | 7/2018 | Westen | G06T 3/40 |
| 10,613,538 | B2* | 4/2020 | Asukai | G05D 1/0212 |
| 2013/0338525 | A1* | 12/2013 | Allen | A61B 5/742 600/534 |
| 2017/0120446 | A1* | 5/2017 | Veltrop | G06N 3/008 |
| 2018/0246514 | A1* | 8/2018 | Mitomo | G05D 1/0038 |
| 2019/0054627 | A1* | 2/2019 | Gomes | B25J 13/081 |
| 2019/0193273 | A1* | 6/2019 | Favis | B25J 11/001 |
| 2019/0389075 | A1* | 12/2019 | Hashimoto | G06F 3/167 |
| 2020/0009737 | A1* | 1/2020 | Kim | B25J 5/007 |
| 2020/0050173 | A1* | 2/2020 | Scherer | G06V 40/174 |
| 2020/0093092 | A1* | 3/2020 | Soug | B25J 5/007 |
| 2020/0114516 | A1* | 4/2020 | Meyer | B25J 13/006 |
| 2020/0114521 | A1* | 4/2020 | Mahoor | B25J 9/1697 |
| 2021/0039251 | A1* | 2/2021 | Moon | G06V 20/10 |
| 2021/0342479 | A1* | 11/2021 | Schluntz | H04L 63/107 |
| 2022/0152836 | A1* | 5/2022 | Ueyama | B25J 5/007 |
| 2022/0180887 | A1* | 6/2022 | Pirjanian | G06Q 10/10 |
| 2022/0241985 | A1* | 8/2022 | Scherer | B25J 11/0015 |

* cited by examiner

*Primary Examiner* — Rockshana D Chowdhury
(74) *Attorney, Agent, or Firm* — Kunzler Bean & Adamson

(57) ABSTRACT

Apparatuses, systems, methods, and computer program products are described for a mount for a computing device. an artificial body shaped to represent at least a portion of a being; and a mounting interface coupled to the artificial body, the mounting interface configured to couple a computing device to the artificial body

20 Claims, 7 Drawing Sheets

MOUNT FOR A COMPUTING DEVICE

CROSS-REFERENCES TO RELATED APPLICATIONS

This application claims the benefit of U.S. Provisional Patent Application No. 63/018,211 entitled "MOUNT FOR A COMPUTING DEVICE" and filed on Apr. 30, 2020, for Thomas Shaffer, which is incorporated herein by reference in its entirety for all purposes.

FIELD

The subject matter disclosed herein relates generally to a mount for a computing device and more particularly relates to a portable mount shaped to represent at least a portion of a being.

BACKGROUND

In certain situations, it may be impossible, inconvenient, inappropriate, unsafe, and/or prohibitively expensive for a human user to visit a certain location in person. For example, during a pandemic and/or quarantine situation, in some embodiments, a visit by a human user may spread a pathogen. In other situations, a location may be contaminated with a chemical, radiation, or the like; may have unsafe animals and/or plants; may have a high crime rate; and/or may have one or more other conditions inappropriate and/or inconvenient for a visit from a human user.

BRIEF SUMMARY

Apparatuses, systems, methods, and computer program products are described for a mount for a computing device. An apparatus, in one embodiment, includes an artificial body shaped to represent at least a portion of a being. In certain embodiments, an apparatus includes a mounting interface coupled to an artificial body and configured to couple a computing device to the artificial body.

Other apparatuses are presented for a mount for a computing device. An apparatus, in a further embodiment, includes means for artificially representing at least a portion of a being. In one embodiment, an apparatus includes means for coupling a computing device to a means for artificially representing at least a portion of a being.

A system, in some embodiments, includes a computing device. In one embodiment, a system includes an artificial body shaped to represent at least a portion of a being. In certain embodiments, a system includes a mounting interface coupled to an artificial body and configured to couple a computing device to the artificial body.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
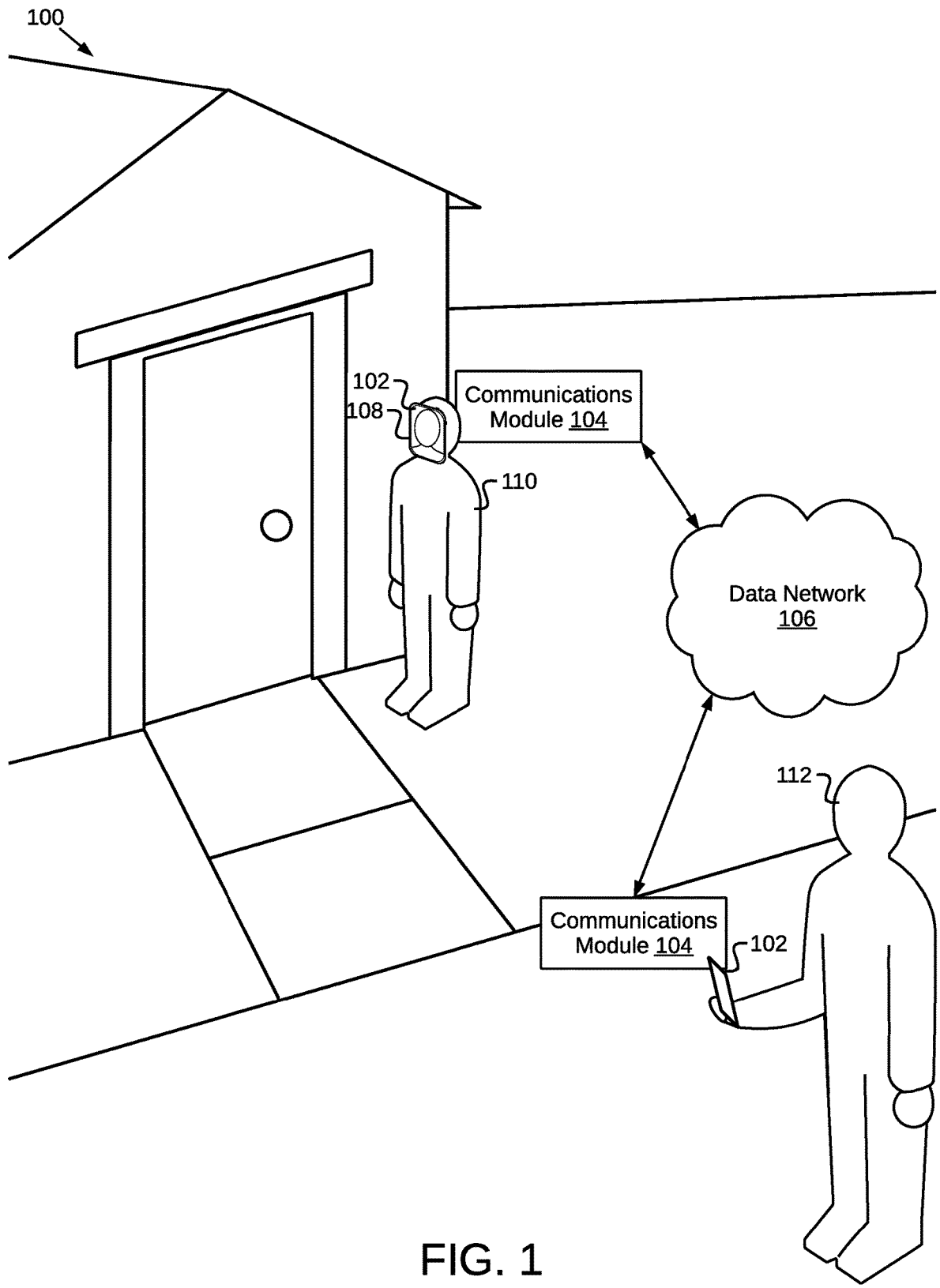
FIG. 1 is a schematic block diagram of one embodiment of a system for a mount for a computing device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable computing devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention.

In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for a mount for a computing device 102. In one embodiment, the system 100 includes one or more artificial bodies 110 with mounting interfaces 108 for one or more computing devices 102, includes one or more communications modules 104, and/or includes one or more data networks 106 or other communication channels. In certain embodiments, even though a specific number of artificial bodies 110, mounting interfaces 108, computing devices 102, communications modules 104, and/or data networks 106 may be depicted in FIG. 1, FIG. 2, and/or FIG. 3, one of skill in the art will recognize, in light of this disclosure, that any number, arrangement, and/or configuration of artificial bodies 110, mounting interfaces 108, computing devices 102, communications modules 104, and/or data networks 106 may be included in other embodiments.

In certain situations, it may be impossible, inconvenient, inappropriate, unsafe, and/or prohibitively expensive for a human user 112 to visit a certain location in person. For example, during a pandemic and/or quarantine situation, in some embodiments, a visit by a human user 112 may spread a pathogen. In other embodiments, a location may be contaminated with a chemical, radiation, or the like; may have unsafe animals and/or plants; may have a high crime rate; and/or may have one or more other conditions inappropriate and/or inconvenient for a visit from a human user 112.

Instead of or in addition to a human user 112 visiting a location, in certain embodiments, an artificial body 110 may be placed (e.g., autonomously or by a human user 112) at a location (e.g., in order to communicate with another user at the location). For example, an artificial body 110 may comprise a mounting interface 108 configured to couple a computing device 102 to the artificial body 110. A communications module 104, in some embodiments, may be disposed (e.g., installed on, in communication with, or the like) on a computing device 102, and may display a graphical user interface, video of a remote user 112 (e.g., a face of the remote user 112), an animated face, and/or another image on the computing device 102. In this manner, in various embodiments, an artificial body 110 with a mounting interface 108 for a computing device 102 may be used in place of a human user 112 for a virtual/remote doctor's visit, door-to-door or other sales visit, police or other emergency response visit, census or other survey visit, and/or another remote and/or virtual communication session.

Artificial, as used herein, means that the being and/or body is not currently living (e.g., an artificial body 110 may comprise organic and/or natural material such as wood, cotton, leather, or the like, but is artificial in that it is not a living being or creature, but an artificial representation of one, or the like). An artificial body 110 may comprise a plastic or other polymer material, an epoxy material, a metallic material, a wood material, a ceramic material, a rubber material, a silicone material, a cement material, a paper material, a hybrid combination of materials, or the like.

In one embodiment, an artificial body 110 is shaped to represent at least a portion of a being. For example, in some embodiments, an artificial body 110 may represent a humanoid (e.g., a mannequin, a human, a humanoid alien, a sasquatch, or the like), a human torso, a human head, and/or another portion of a being. In further embodiments, an artificial body 110 may be shaped to represent at least a portion of an animal (e.g., a dog, a cat, a bear, a bird, a monkey, and/or another animal). In other embodiments, an artificial body 110 may be shaped to represent at least a portion of a fictional character (e.g., an alien, a sasquatch, a unicorn, a monster, a cartoon character, and/or another fictional character).

A mounting interface 108, in one embodiment, may removably couple a computing device 102 to an artificial body 110. For example, a mounting interface 108 may comprise a magnetic interface, with one or more of a magnet and a metal (e.g., one or more metallic plates or the like) disposed on a computing device 102 and/or a case for the computing device 102, which align with a corresponding one or more of a magnet and a metal coupled to the artificial body 110 (e.g., the mounting interface 108 of the artificial body 110). In a further embodiment, a mounting interface 108 may comprise a mechanical clamp, or the like, shaped to releasably receive a computing device 102.

In some embodiments, a mounting interface 108 may fixedly couple a computing device 102 to an artificial body 110. For example, a mounting interface 108 may permanently and/or semi-permanently couple, integrate, and/or otherwise attach a computing device 102 to an artificial body 110 (e.g., using an adhesive, a glue, a weld, an integrated housing and/or case, or the like).

In one embodiment, a mounting interface 108 may be coupled to a face portion of an artificial body 110. In a further embodiment, a mounting interface 108 may be coupled to a hand portion of an artificial body 110. A mounting interface 108, in some embodiments, may be coupled to a chest portion of an artificial body 110. In other embodiments, a mounting interface 108 may be coupled to another location of an artificial body 110.

In one embodiment, instead of being disposed on an exterior surface of an artificial body 110, the artificial body 110 may comprise a cavity shaped to receive the computing device 102 with a mounting interface 108 disposed within the cavity. In a further embodiment, a transparent material (e.g., a plastic, a glass, a plexiglass, or the like) may be at least selectively disposed over a cavity such that a screen of a computing device 102 is viewable through the transparent material in response to a mounting interface 102 coupling the computing device 102 to the artificial body 110.

In one embodiment, a computing device 102 may comprise a mobile device, such as a mobile phone, a tablet device, a laptop computer, a video gaming device, or the like. In another embodiment, a computing device 102 may be at least partially integrated with an artificial body 110 (e.g., a processor, a memory, a non-volatile storage medium, an electronic display screen, a microphone, a speaker, or the like may be embedded in and/or otherwise integrated with an artificial body 110).

In one embodiment, an artificial body 110 may comprise at least a portion of an inanimate mannequin or the like (e.g., may be carried, rolled, and/or otherwise delivered to a target location). An artificial body 110 comprising an inanimate mannequin, in some embodiments, may comprise one or more wheels or the like to simplify transportation of the artificial body 110.

In a further embodiment, an artificial body 110 may be at least partially robotic (e.g., with one or more mechanically driven wheels, tracks, legs, arms, attachments, neck, head, hands, fingers, feet, toes, face, mouth, eyes, ears, or other appendages facilitating mechanical movement and/or transport of at least a portion of the artificial body 110). For example, an artificial body 110 may comprise an at least partially robotic appendage (e.g., arm, hand, and/or finger, or the like) configured to open a gate to enter a user's property, an artificial body 110 may comprise one or more at least partially robotic appendages (e.g., legs and/or feet, or the like) configured to climb one or more stair steps to a user's residence, an artificial body 110 may comprise one or more at least partially robotic appendages (e.g., arms, hands, and/or fingers, or the like) configured to ring a doorbell associated with a door of a user, or the like. In other embodiments, an artificial body 110 may be remote controlled, may be self-guiding (e.g., using a camera and/or another sensor and image recognition or other machine learning processing, a global positioning system ("GPS") and/or another location sensor, or the like), and/or may otherwise navigate between locations.

In some embodiments, one or more robotic actions of an artificial body 110 may be manually controlled (e.g., by a remote user 112 remotely over a data network 106 or the like using a control pad, touchscreen, keyboard, joystick, augmented reality interface, or the like of a computing device 102 of the remote user 112). In one embodiment, a communications module 104 may maintain (e.g., store in a non-volatile computer readable storage medium) a library of scripted gestures and/or other scripted actions for an artificial body 110 to perform (e.g., nodding head, shaking head, shrugging, shaking hands, winking, blinking, smiling, frowning, dancing, jumping, pointing an arm/hand/finger in a predefined direction, pointing head up/down/left/right, knocking on a door, ringing a doorbell, climbing stairs, navigating to a neighbor's house, returning to a previous house, returning to base (e.g., an original drop off location, a user's vehicle, a local office or other building, or the like), and/or another predefined gesture and/or action).

A communications module 104, in certain embodiments, may present a remote user 112 an interface (e.g., a graphical user interface, one or more mechanical or virtual buttons, voice commands, or the like) to manually select a scripted gesture and/or another scripted action for an artificial body 110 to perform. In a further embodiment, a communications module 104 may automatically select a scripted gesture and/or another scripted action for an artificial body 110 to perform (e.g., based on information from one or more sensors of the artificial body 110 such as an audio microphone, a camera, a motion sensor, a GPS or other location sensor, or the like).

For example, a communications module 104, in various embodiments, may be configured to adjust a direction in which a robotic head of an artificial body 110 is pointing based on a determined height of another user with which the artificial body 110 is interacting (e.g., based on an image and/or video of the other user from a camera of the computing device 102 of the artificial body 110 or the like), may be configured to trigger the artificial body 110 to blink, nod, shrug, or the like in response to a trigger (e.g., a timer, detecting a predetermined trigger condition such as a word/phrase in a conversation with the other user, or the like), and/or may be configured to cause the artificial body 110 to perform another scripted action in response to detecting a trigger based on information from a sensor. Providing a library of scripted gestures and/or other scripted actions for an artificial body 110, in some embodiments, may allow interactions with the artificial body 110 and/or a computing device 102 mounted thereon to be more natural, realistic, and/or authentic (e.g., for more natural interactions, mannerisms, or the like).

In certain embodiments, a portion of an artificial body 102 to which a computing device 102 is coupled is robotic and/or otherwise mechanically actuated, allowing the computing device 102 to be moved and/or adjusted independently from one or more other portions of the artificial body 102 (e.g., based on remote commands from a computing device 102 of a remote user 112, in response to a trigger automatically detected by a communications module 104, or the like). A portion of an artificial body 102 to which a computing device 102 is coupled (e.g., a head, an arm, a hand, a torso, a leg, a foot, a back, or the like), in one embodiment, may be removable from a remainder of the artificial body 102 (e.g., to simplify transportation of the computing device 102, to facilitate and/or simplify interaction of a user with the computing device 102, to enable one or more other functions of the computing device 102 such as the document signature function described below or the like, and/or to allow one or more other uses of the computing device 102).

A computing device 102, in some embodiments, may comprises a flexible, curved, electronic display screen (e.g., a liquid crystal display (LCD), a light emitting diode (LED) display, an organic LED (OLED) display, a quantum dot LED (QLED) display, or the like). For example, a curved electronic display screen may allow a more realistic display of a face on the computing device 102, or the like. In another embodiment, a computing device 102 may comprise an at least semi-transparent surface and a projector positioned to project an image onto a rear of the semi-transparent surface. For example, the at least semi-transparent surface may be substantially skin colored, may be shaped like a face (e.g., a human face, an animal face, a face of a fictional character or being, or the like), or the like, and a projector may project one or more facial features onto a rear of the semi-transparent surface, such that the one or more facial features are visible on a front of the semi-transparent surface (e.g., a mouth, eyes, a nose, or the like).

A computing device 102, in various embodiments, may be configured to display an image, a video, or the like of a remote user 112 (e.g., a face of a remote user 112) to facilitate a video chat or the like with another user in closer proximity to the artificial body 110, may display an animated face (e.g., a preconfigured animated video, a live animated face based on detected facial movement of a remote user 112, or the like). In a further embodiment, a computing device 102 may apply one or more image filters to a display of a remote user 112 on an electronic display (e.g., one or more animated features, additional information regarding a message of the remote user 112, one or more digital effects, one or more color and/or photo adjustments, or the like).

In one embodiment, a computing device 102 comprises a touchscreen (e.g., facing away from the artificial body 110 in response to the mounting interface 108 coupling the computing device 102 to the artificial body 110, or the like). A computing device 102, in some embodiments, may be configured to provide a user interface on the touchscreen (e.g., instead of or in addition to displaying a face of a remote user 112). For example, in one embodiment, a user interface on a touchscreen of a computing device 102 may comprise a document signature interface allowing a user to digitally sign an electronic document displayed on the touchscreen of the computing device 102. In certain embodiments, a computing device 102 and/or a portion of an artificial body 110 to which a computing device is coupled may be removable from an artificial body 110 and/or a mounting interface 108, to facilitate a signature by a user. In other embodiments, a user may access a document signature interface while a touchscreen of a computing device 102 is coupled to an artificial body 110 by a mounting interface 108. In other embodiments, a computing device 102 may display a graphical user interface on an electronic display screen (e.g., a touchscreen or the like) for an interactive training session for the user, a sales presentation, a contract, an educational presentation, or the like.

A mounting interface 108, in one embodiment, comprises one or more electrical connections between an artificial body 110 and a computing device 102. For example, in some embodiments, one or more electrical connections of a mounting interface 108 may comprise a charging interface configured to electrically charge the computing device 102 with electricity from an artificial body 110 (e.g., from a battery integrated with and/or otherwise embedded within the artificial body 110 and in electrical communication with the charging interface), such as a hard-wired connection (e.g., a universal serial bus (USB) connection and/or another electrical wire connection, a wireless electromagnetic inductive charging interface, or the like. In a further embodiment, one or more electrical connections of a mounting interface 108 may comprise one or more audio connections (e.g., an artificial body 110 may comprise one or more of an audio speaker, a microphone, or the like in electrical communication with the one or more audio connections of the mounting interface 108). An audio connection, in various embodiments, may be wireless (e.g., Bluetooth®), hardwired, or the like.

In one embodiment, an artificial body 110 may comprise an internal compartment or the like, within the artificial body 110, storing and providing external access to one or more of a battery, an audio speaker, a microphone, an antenna, electrical wiring, or the like (e.g., which may be in electrical communication with a computing device 102 through a mounting interface 108 via internal wiring within the artificial body 110, or the like). An artificial body 110, in some embodiments, may comprise a cover configured to selectively enclose the compartment (e.g., fabric, plastic, metal, glass, and/or another durable material). In other embodiments, a compartment may be open to the environment (e.g., without a cover), may be covered by clothing of the artificial body 110, or the like.

A computing device 102, in one embodiment, may comprise an electronic display configured to display a remote user 112 from a different location than an artificial body 110 to a local user within viewing proximity of the electronic display. A remote user 112, in various embodiments, may be disposed a few feet away from the artificial body 110 (e.g., at or near a street, in a nearby vehicle of the remote user 112, elsewhere in a same neighborhood as the artificial body 110, or the like). In a further embodiment, a remote user 112 may be disposed more than a few feet away from an artificial body 110 (e.g., at a remote office and/or data center, or another remote location). A computing device 102 of a remote user 112 may be in communication with a computing device 102 of an artificial body 110 over a data network 106 (e.g., a wireless data network 106 such as a cellular communications network, a Wi-Fi network, a Bluetooth® network, a near-field communication (NFC) network, an ad hoc network, and/or the like; a wired data network 106 such as an Ethernet network, a wide area network (WAN), a storage area network (SAN), a local area network (LAN), an optical fiber network, the internet; and/or the like).

In embodiments with multiple additional artificial bodies 110 and mounting interfaces 108 each coupling an additional computing device 102 to the additional artificial bodies 110, a single remote user 112 may operate (e.g., broadcast video of the remote user, remote control and/or navigate, or the like) multiple artificial bodies 110, or each artificial body 110 may be operated by different remote users 112 (e.g., may display different remote users 112, or the like).

In one embodiment, one or more computing devices 102 (e.g., hardware devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the computing devices 102 are in communication with one or more servers 102 and/or other computing devices 102 via a data network 106, described below. The computing devices 102, in a further embodiment, are capable of executing various programs, program code, applications, instructions, functions, or the like.

In one embodiment, a communications module 104 is configured to control and/or communicate with one or more computing devices 108 to perform one or more of the functions described above. For example, in some embodiments, a communications module 104 may provide a video chat interface between a remote user 112 and a user in closer proximity to the artificial body 110, using a computing device 102 coupled to the artificial body 110 and a computing device 102 of the remote user 112 (e.g., transmitting a video of the remote user 112 from a camera of the computing device 102 of the remote user 112 to the computing device 102 of the artificial body 110 for display, and transmitting a video of another user in closer proximity to the artificial body 110 from a camera of the computing device 102 of the artificial body 110 to the computing device 102 of the remote user 112 for display, or the like). In other embodiments, a communications module 104 may apply one or more image filters to a video and/or image displayed on an electronic display screen of a computing device 102, may display a graphical user interface on an electronic display screen of a computing device 102, and/or may perform one or more other functions for a computing device 102.

In various embodiments, a communications module 104 may be embodied as hardware, software, or some combination of hardware and software. In one embodiment, a communications module 104 may comprise executable program code stored on a non-transitory computer readable storage medium for execution on a processor of a computing device 102, a backend server 102, or the like. For example, a communications module 104 may be embodied as executable program code executing on one or more of a computing device 102, a backend server 102, a combination of one or more of the foregoing, or the like. In such an embodiment, the various modules that perform the operations of a communications module 104, may be located on a computing device 102, a backend server 102, a combination of the two, and/or the like.

In various embodiments, a communications module 104 may be embodied as a hardware appliance that can be installed or deployed on a backend server 102, on a user's computing device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's computing device 102. In certain embodiments, a communications module 104 may comprise a computing device such as a secure hardware dongle or other hardware appliance device (e.g., a set-top box, a network appliance, or the like) that attaches to another computing device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a communications module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a communications module 104.

A communications module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a communications module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a communications module 104.

The semiconductor integrated circuit device or other hardware appliance of a communications module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a communications module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the interne, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

Figure 2:
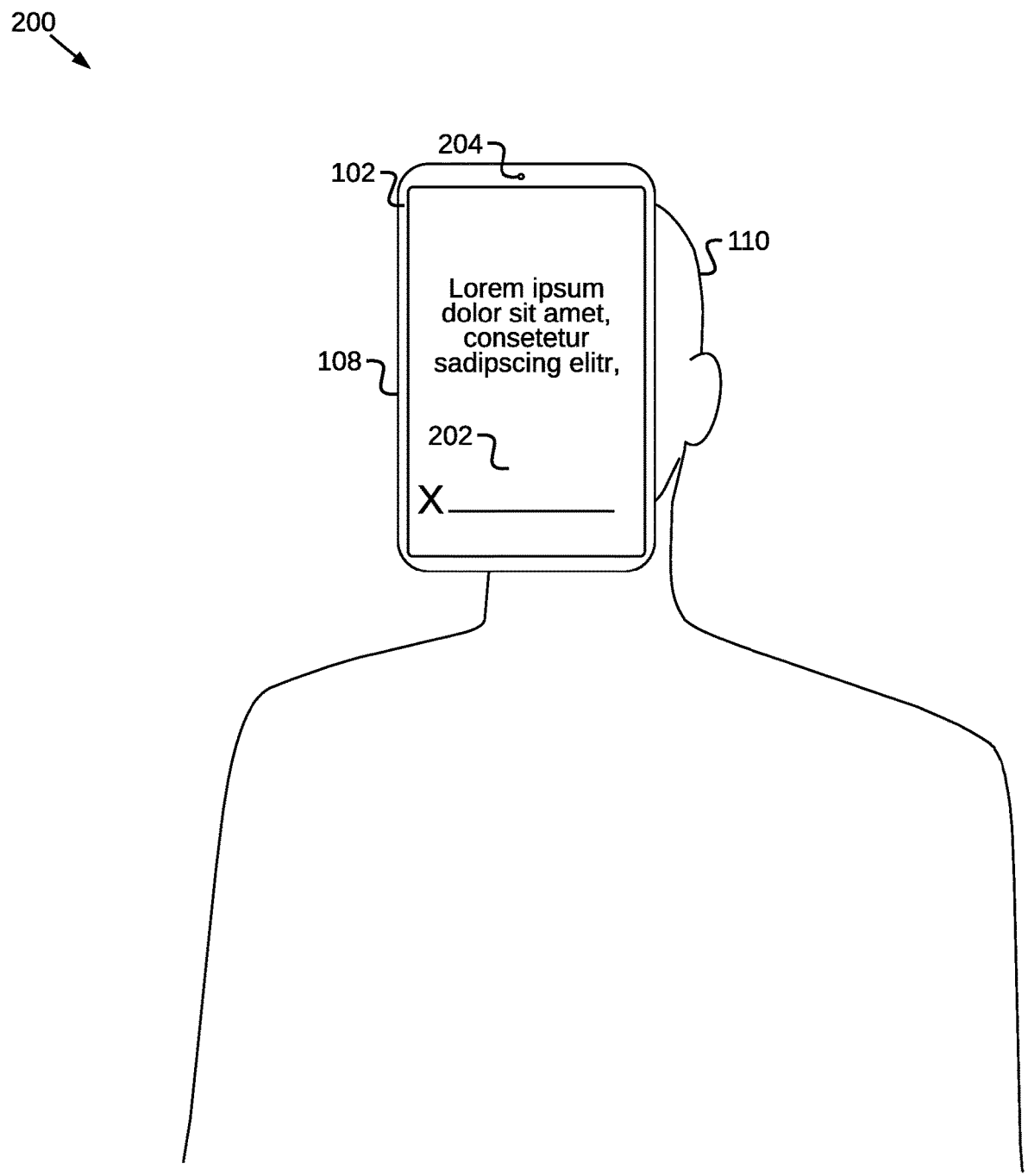
FIG. 2 is a schematic block diagram of one embodiment of a mount for a computing device.

FIG. 2 depicts one embodiment of a system 200 for a mounting interface 108 for an artificial body 110. In the depicted embodiment, the system 200 includes a computing device 102, a mounting interface 108, and an artificial body 110. The artificial body 110, in the depicted embodiment, is humanoid, representing at least a portion of a being.

An electronic display screen of the computing device 102, in the depicted embodiment, displays a graphical user interface comprising a document signature interface 202 (e.g., instead of or in addition to displaying a face of a remote user 112). A document signature interface 202, in certain embodiments, allows a user to digitally sign an electronic document displayed on the touchscreen of the computing device 102 (e.g., using a finger, a stylus, or the like). In certain embodiments, a computing device 102 and/or a portion of an artificial body 110 to which a computing device is coupled may be removable from an artificial body 110 and/or a mounting interface 108, to facilitate a signature by a user. In other embodiments, a user may access a document signature interface 202 while a touchscreen of a computing device 102 is coupled to an artificial body 110 by a mounting interface 108. In other embodiments, a computing device 102 may display a graphical user interface on an electronic display screen (e.g., a touchscreen or the like) for an interactive training session for the user, a sales presentation, a contract, an educational presentation, or the like. In response to a user executing an agreement or other document using the document signature interface 202, in certain embodiments, a communications module 104 may send (e.g., email, print, text message, or the like) a copy of the executed document to the user, to an administrator for the computing device 102, or the like.

In the depicted embodiment, the computing device 102 comprises one or more sensors 204. In other embodiments, the artificial body 110 may comprise one or more sensors 204. A sensor 102, in general, monitors and/or otherwise determines data from an environment and/or other surroundings of an artificial body 110. In various embodiments, a sensor 204 may comprise a camera or other image sensor, a GPS or another location sensor, a microphone or other audio sensor, a motion sensor, a gyroscope or other position and/or movement sensor, a touchscreen or other touch sensitive sensor, a radar sensor, a lidar sensor, and/or one or more other sensors 102.

Figure 3:
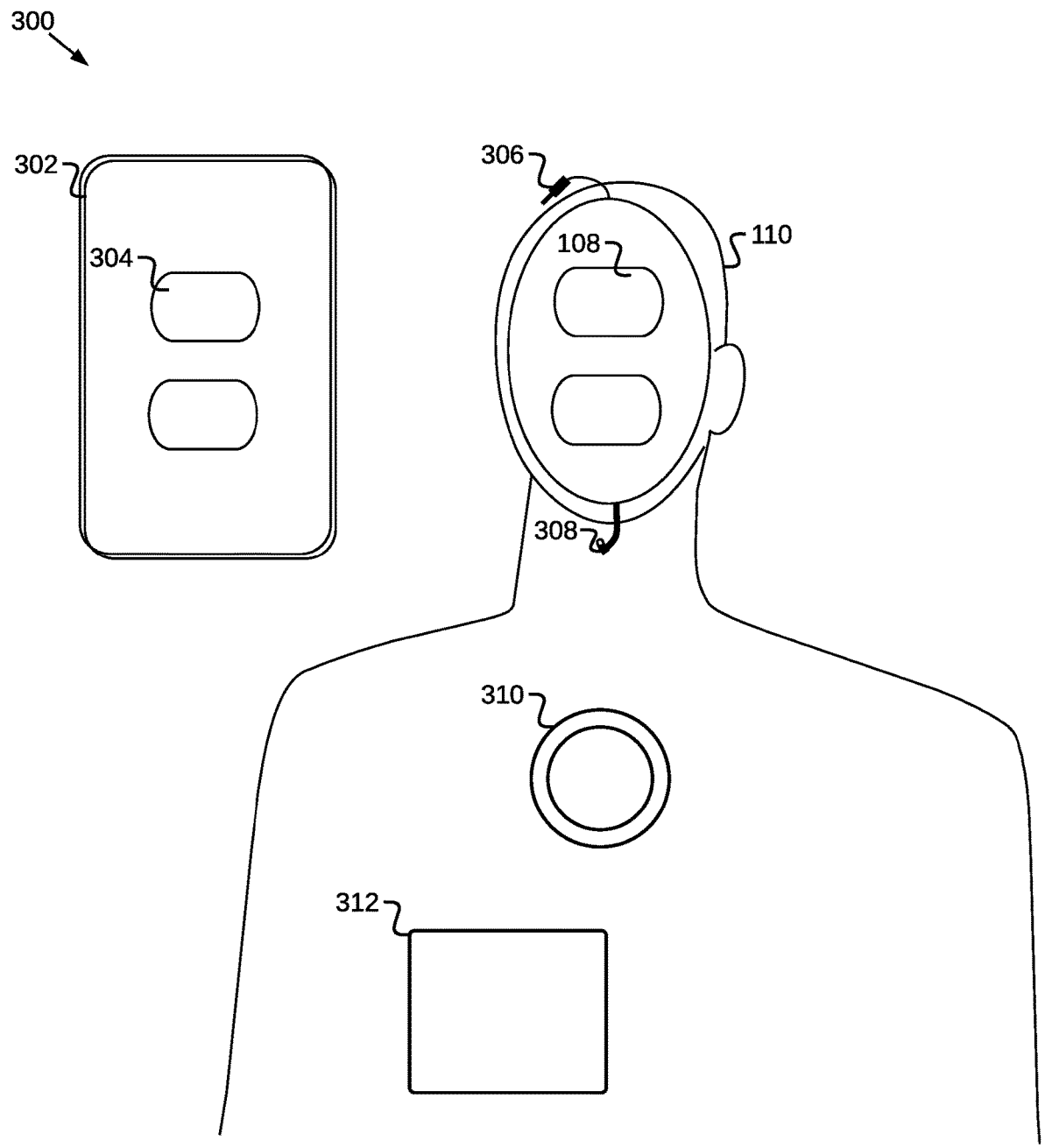
FIG. 3 is a schematic block diagram of a further embodiment of a mount for a computing device.

FIG. 3 depicts one embodiment of a system 300 for a mounting interface 108 for an artificial body 110. In FIG. 3, the mounting interface 108 further includes a case 302 for a computing device 102, one or more magnets and/or metals 304 for removably coupling a computing device 102 to an artificial body 110, one or more electrical connections 306, 308 such as an audio connection 306 and a charging connection 308 or the like for the computing device 102, an audio device 310, and a compartment 312 in the artificial body 110.

The case 302, in the depicted embodiment, is shaped to removably receive a mobile computing device 102. The case 302 may comprise a durable material, such as a plastic or other polymer, silicone, rubber, leather, fabric, or the like. In the depicted embodiment, the case 302 is also removably couplable to the artificial body 110 using one or more magnets and/or metals 304, corresponding to one or more complementary magnets and/or metals of the mounting interface 108, thereby removably coupling the case 302 and an installed computing device 102 to the artificial body 110 via the mounting interface 108. In other embodiments, the case 302 may comprise one or more hooks, clips, clamps, notches, hook-and-loop materials, adhesives, and/or other fasteners to couple the case 302 to the artificial body 110 via the mounting interface 108. In a further embodiment, the mounting interface 108 may fixedly attach the case 302 to the artificial body 110, such that the case 302 is integrated with the artificial body 110 and not removable.

The audio connection 306, in various embodiments, may comprise a 3.5 mm audio connection, an RCA audio connection, a USB connection, a wireless connection (e.g., Bluetooth® or the like), and/or one or more other audio connections 306 between a computing device 102 and an audio device 310 of an artificial body 110. The audio device 310 may comprise a speaker, a microphone or other sensor, and/or another audio device 310 installed and/or embedded in an artificial body 110. In certain embodiments, the audio connection 306 and the charging connection 308 may be combined in a single interface (e.g., a USB connection or the like). The charging connection 308, in one embodiment, may comprise a wireless charging interface (e.g., inductive charging or the like) embedded within the mounting interface 108.

In some embodiments, the artificial body 110 may comprise a data connection 308, using which a communications module 104 or other controller may provide one or more commands or other instructions from a computing device 102 to the artificial body 110 (e.g., to control one or more robotic appendages 402, to receive sensor data, or the like). In some embodiments, the artificial body 110, a computing device 102, or the like may be configured to send and/or receive commands or other instructions, sensor data, or the like over a data network 106, instead of or in addition to communicating using a data connection 308.

In the depicted embodiment, the artificial body 110 comprises an internal compartment 312 or the like, within the artificial body 110, storing and providing external access to one or more of a battery, an audio speaker, a microphone, a sensor, a circuit board, a controller, a communications module 104, an antenna, electrical wiring, fuel, robotic or other mechanical and/or electrical hardware, or the like (e.g., which may be in electrical communication with a computing device 102 through a mounting interface 108 via internal wiring 306, 308 within the artificial body 110, or the like). An artificial body 110, in some embodiments, may comprise a cover configured to selectively enclose the compartment 312 (e.g., fabric, plastic, metal, glass, and/or another durable material). In other embodiments, a compartment may be open to the environment (e.g., without a cover), may be covered by clothing of the artificial body 110, or the like.

Figure 4A:
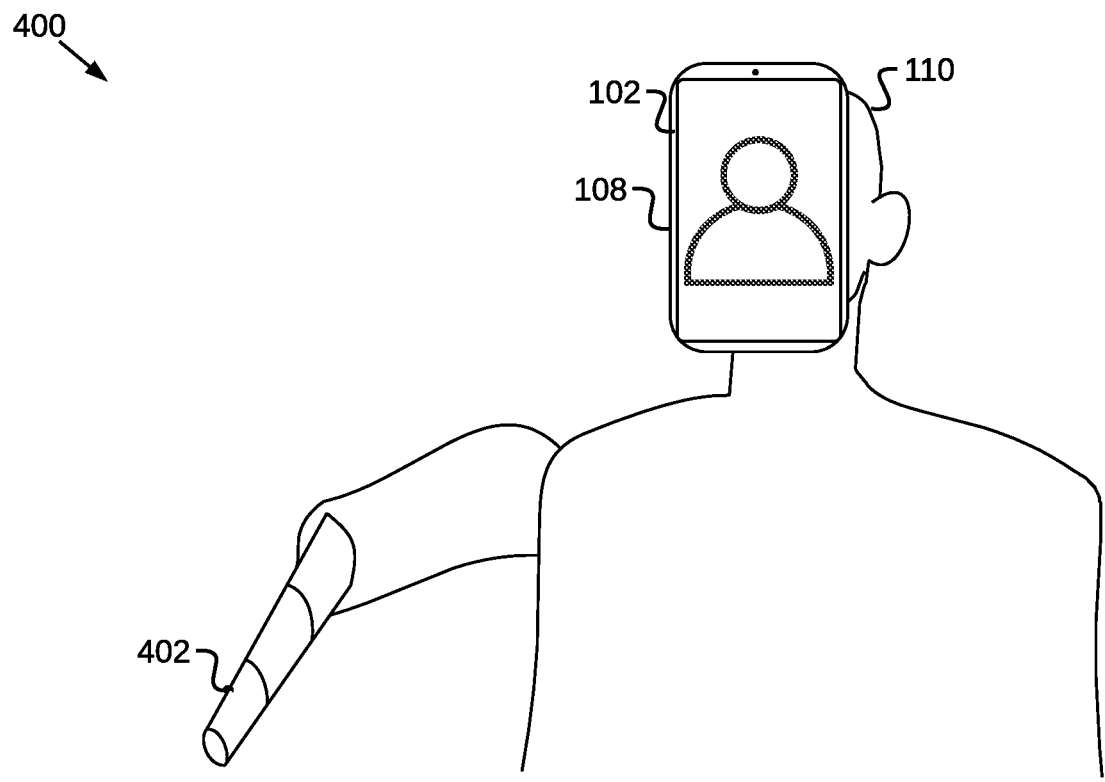
FIG. 4A is a schematic block diagram of one embodiment of an at least partially robotic appendage.

FIG. 4A depicts one embodiment 400 of an at least partially robotic appendage 402 comprising a robotic arm 402. The robotic arm 402, in certain embodiments, may be mechanically and/or electrically actuated (e.g., with a servo or other motor, one or more gears, one or more belts or chains, one or more joints or hinges, or the like. In the depicted embodiment, the robotic arm 402 is telescoping, allowing a communications module 104 or other controller for the artificial body 110 to mechanically and/or electrically extend and/or retract a telescoping portion of the robotic arm 402. For example, a telescopic robotic arm 402 may be configured to extend to ring a doorbell, open a gate, knock on a door, or the like. The robotic arm 402, in some embodiments, may rotate and/or bend around a joint (e.g., a shoulder joint, an elbow joint, a wrist joint, or the like) to facilitate one or more scripted actions, gestures, or the like (e.g., in conjunction with a telescoping action of the robotic arm 402, or the like).

Figure 4B:
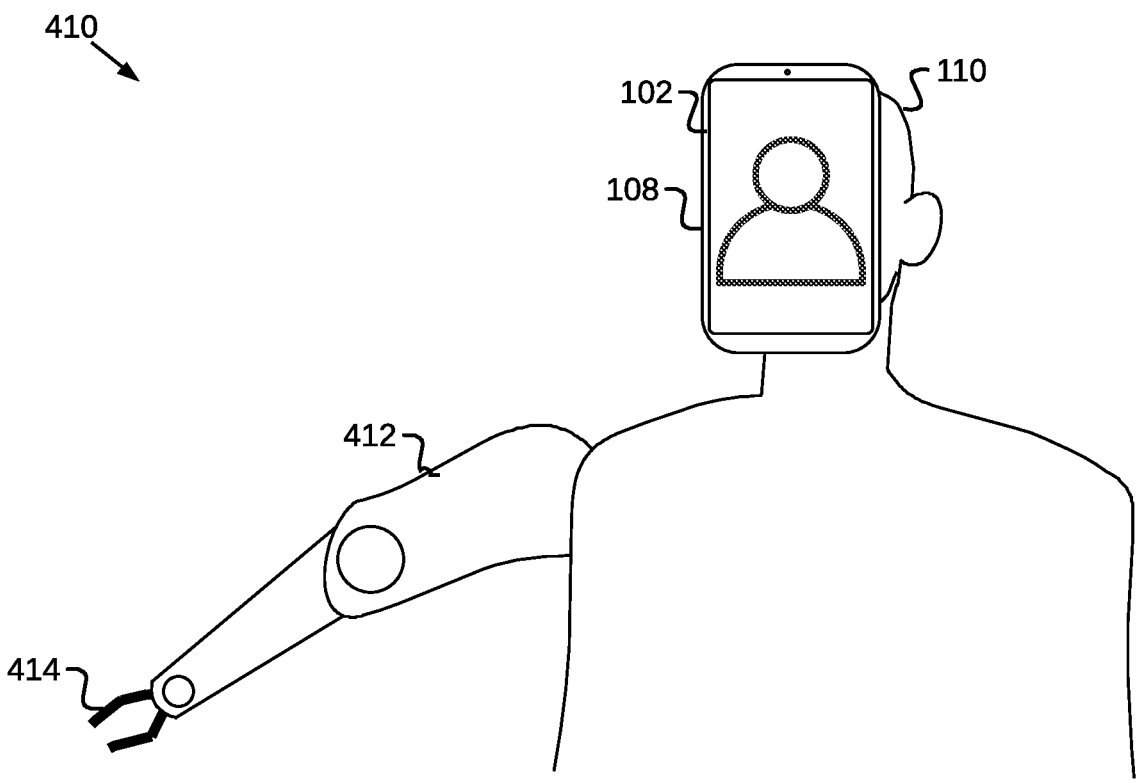
FIG. 4B is a schematic block diagram of a further embodiment of an at least partially robotic appendage.

FIG. 4B depicts a further embodiment 410 of an at least partially robotic appendage 412, 414 comprising a robotic arm 412 and one or more robotic fingers/hands 414. The robotic arm 412, in certain embodiments, may be configured to rotate and/or bend around one or more joints (e.g., a shoulder joint, an elbow joint, a wrist joint, or the like). The one or more robotic fingers and/or hands 414 may be individually and/or jointly robotically articulated to facilitate one or more scripted actions, gestures, or the like (e.g., ringing a doorbell, opening a gate or door, pressing a button, shaking a hand, or the like).

Figure 5A:
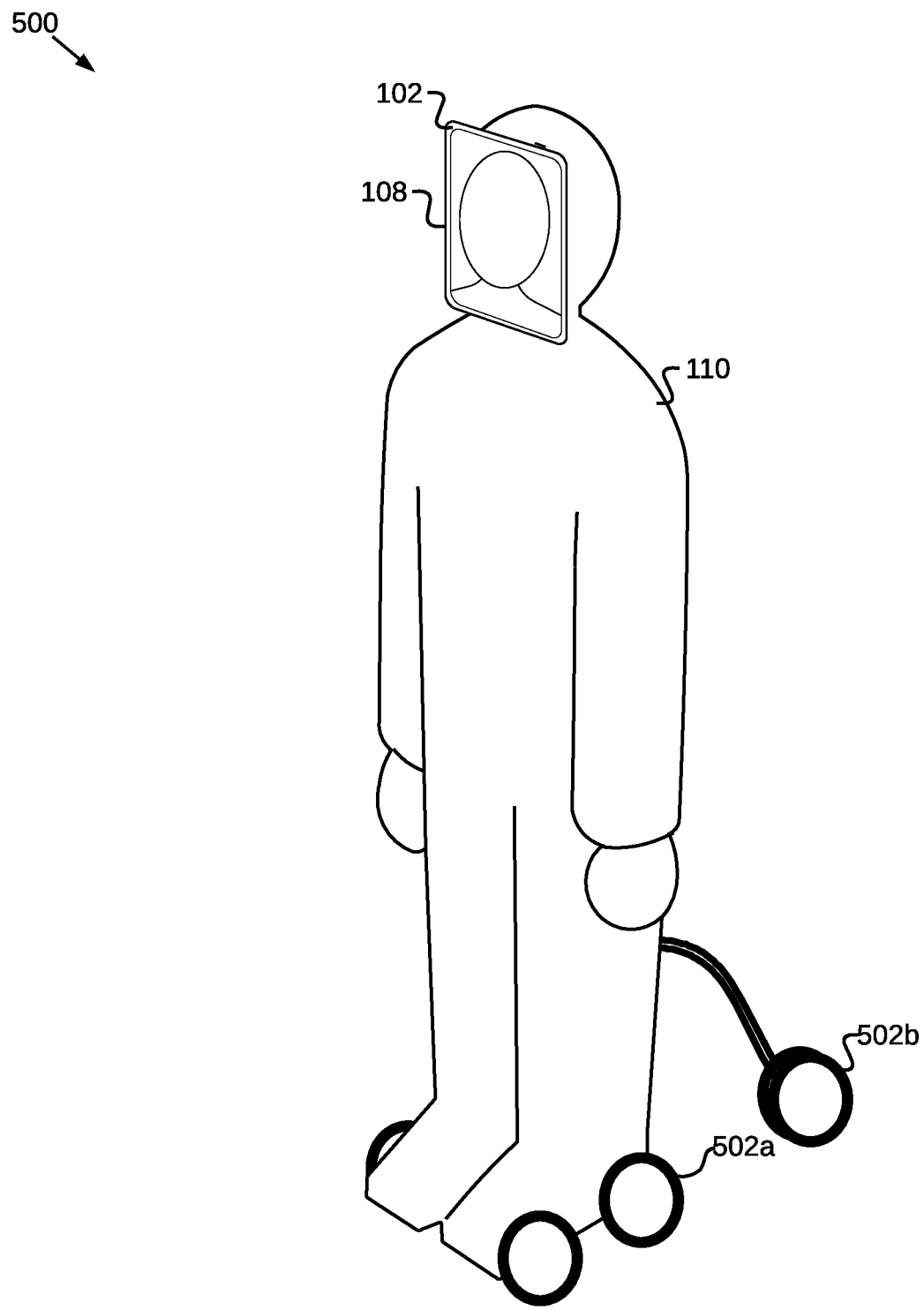
FIG. 5A is a schematic block diagram of one embodiment of an at least partially robotic appendage.

FIG. 5A depicts one embodiment of one or more at least partially robotic appendages 502*a-b*. The at least partially robotic appendages 502*a-b*, in the depicted embodiment, include sets of wheels 502*a-b*, facilitating movement of the artificial body 110 (e.g., between houses, residences, or other locations, within a building, or the like), performance of one or more scripted actions, or the like. In other embodiments, the at least partially robotic appendages 502*a-b* may comprise robotic tracks, robotic legs, or the like. In the depicted embodiment, the at least partially robotic appendages 502*a-b* comprise at least a first set of wheels 502*a* and a second set of wheels 502*b*, offset from the first set of wheels 502*a*. An offset second set of wheels 502*b* or other offset robotic appendage 502, in certain embodiments, may increase balance and/or stability of the artificial body 110 (e.g., during movement or the like), may allow the artificial body 110 to climb stairs or other obstacles (e.g., maintaining a stable balance while one set of wheels 502*a*, 502*b* or other robotic appendage 502 lifts and/or tilts to climb a step or other obstacle), or the like.

Figure 5B:
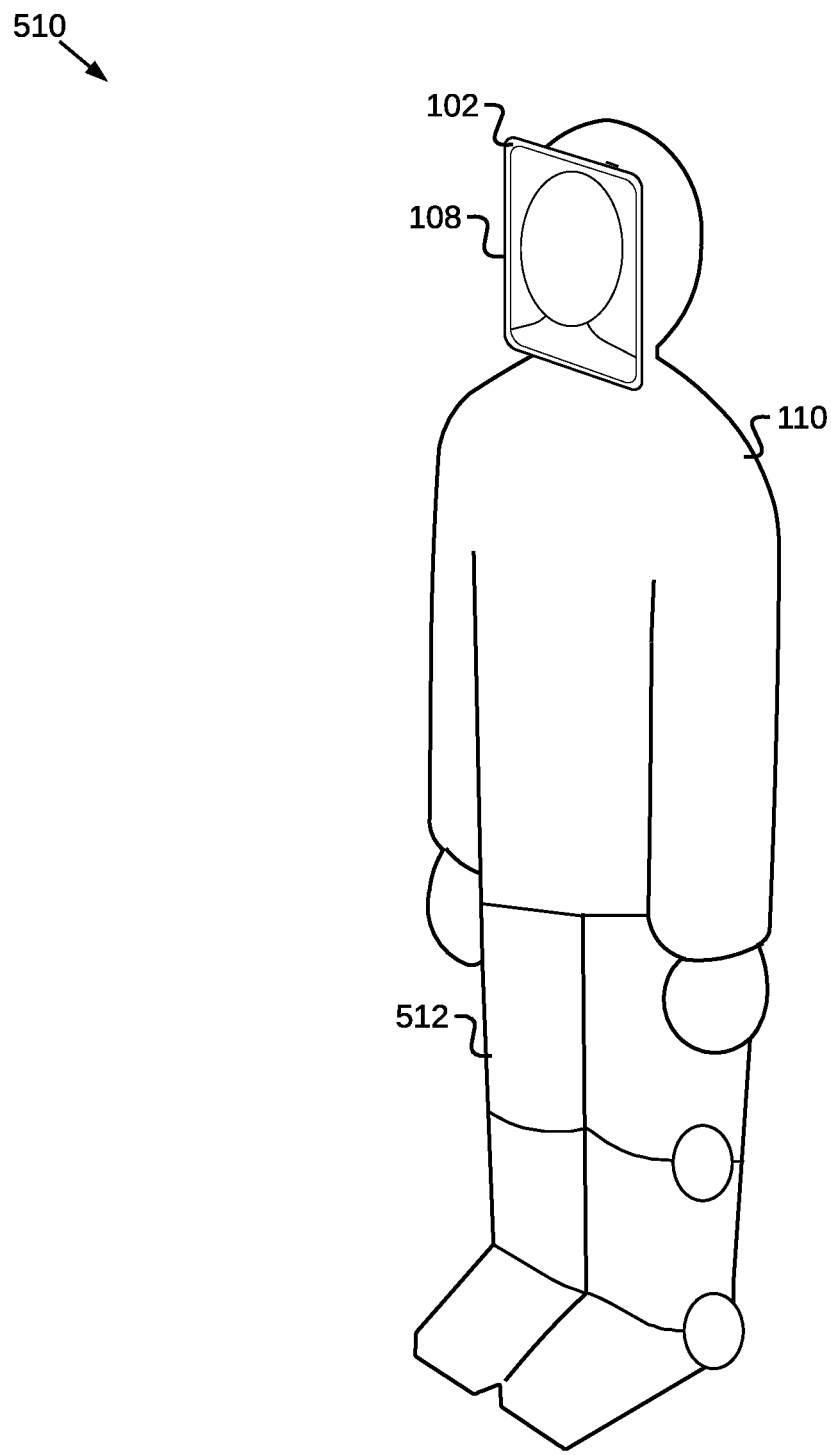
FIG. 5B is a schematic block diagram of a further embodiment of an at least partially robotic appendage.

FIG. 5B depicts a further embodiment of one or more at least partially robotic appendages 512. The at least partially robotic appendages 512, in the depicted embodiment, comprise mechanically and/or electrically actuated robotic legs 512. The artificial body 110, in certain embodiments, may use the robotic legs 512 to take one or more steps (e.g., walk) to move the artificial body 110, to perform one or more scripted actions 604, or the like. The robotic legs 512 may rotate and/or bend around one or more joints (e.g., a hip joint, a knee joint, an ankle joint, or the like).

Figure 6:
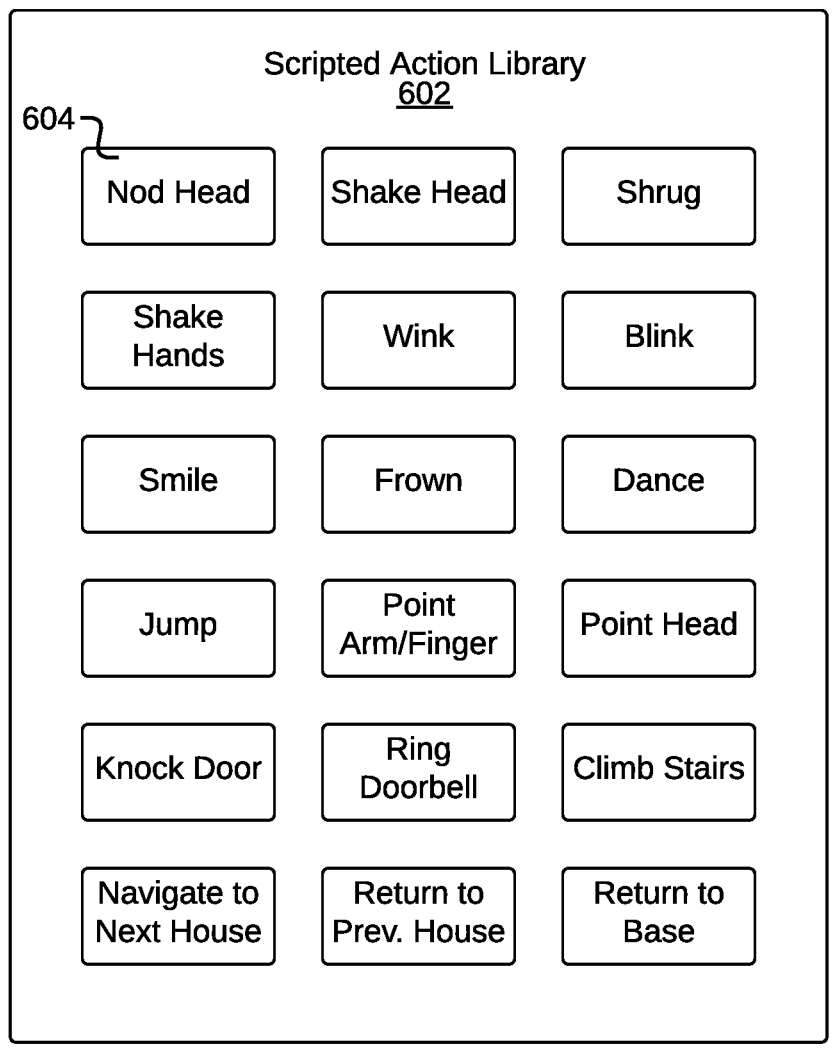
FIG. 6 is a schematic block diagram of a scripted action library.

FIG. 6 depicts one embodiment 600 of a scripted action library 602 comprising a plurality of scripted actions 604 for one or more at least partially robotic appendages 402, 412, 414, 502, 512. A communications module 104 or other controller, in certain embodiments, may present the scripted action library 602 to a remote user 112 in a graphical user interface of a computing device 102 (e.g., on a touchscreen and/or another electronic display screen, or the like). For example, a communications module 104 or other controller may present each scripted action 604 as a selectable button and/or other user interface element which the remote user 112 may select for one or more robotic appendages 402, 412, 414, 502, 512 of an artificial body 110 to perform. In one embodiment, one or more scripted actions 604 may comprise a plurality of scripted steps, commands, and/or sub-actions (e.g., defined movements or other commands for individual robotic appendages 402, 412, 414, 502, 512, for display on an electronic display screen of a computing device 102 coupled to an artificial body 110, sounds to play using a speaker 310, and/or other steps to complete a scripted action 604).

In various embodiments, a means for artificially representing at least a portion of a being, may include one or more of an artificial body 110, a mannequin, a representation of a humanoid, a representation of an alien, a representation of a sasquatch, a representation of a human torso, a representation of a human head, a representation of an animal, a representation of a dog, a representation of a cat, a representation of a bear, a representation of a bird, a representation of a monkey, a representation of another animal, a representation of a unicorn, a representation of a monster, a representation of a cartoon character, a representation of another fictional character, a statue, a robot, an android, a stuffed animal, a toy, and/or another artificial body 110. Other embodiments may include substantially similar or equivalent means for artificially representing at least a portion of a being.

In various embodiments, a means for coupling a computing device 102 to an artificial body 110, may include one or more mounting interfaces 108, cases 302, metals and/or magnets 304, adhesives, glues, welds, integrated housings, hooks, clips, clamps, notches, hook-and-loop materials, fasteners, and/or other mounting interfaces 108. Other embodiments may include substantially similar or equivalent means for coupling a computing device 102 to an artificial body 110.

In various embodiments, a means for performing scripted actions may include one or more of an at least partially robotic appendage 402, 412, 414, 502, 512, a communications module 104, a computing device 102, an artificial body 110, a controller, a processor, an FPGA, a microprocessor, a servo, a hydraulic device, a mechanical device, an electronic device, a joint, a hinge, a wheel, a track, a robotic leg, a robotic arm, a robotic hand, a robotic finger, a telescopic robotic appendage, a gear, a belt, a chain, executable program code stored on a non-transitory computer readable storage medium, or the like. Other embodiments may include substantially similar or equivalent means for performing scripted actions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
an artificial body shaped to represent at least a portion of a being and comprising at least one robotic appendage;
a mounting interface coupled to a face portion of the artificial body, the mounting interface configured to removably couple a computing device to the artificial body such that the computing device is selectively removable from the artificial body, the mounting interface compatible with various types of computing devices that are selectively removable from the mounting interface; and
a communication module configured to:
receive a live image or video of a remote user from a remote device communicatively coupled to the computing device;
display the live image or video of the remote user on the computing device that is removably coupled to the mounting interface on the face portion of the artificial body;
receive input from the remote device via a remote interface separate from the mounting interface and displaying a plurality of actions and an identification of a robotic appendage of the at least one robotic appendage configured to perform each action of the plurality of actions, the input comprising a selection of an action to be performed by the robotic appendage; and
actuate the robotic appendage to perform the action received from the remote device.

2. The apparatus of claim 1, wherein the computing device comprises a mobile device.

3. The apparatus of claim 1, wherein the being represented by the artificial body comprises one or more of a humanoid, an animal, and a fictional being.

4. The apparatus of claim 1, wherein the artificial body comprises at least a portion of an inanimate mannequin.

5. The apparatus of claim 1, wherein the artificial body is at least partially robotic and the plurality of actions comprise a plurality of scripted actions defined for robotic movement of the at least one robotic appendage.

6. The apparatus of claim 5, wherein the at least partially robotic artificial body is configured to receive control commands over a data network, the control commands indicating which of the plurality of scripted actions the at least one robotic appendage performs.

7. The apparatus of claim 5, wherein the at least partially robotic artificial body comprises one or more sensors, the at least partially robotic artificial body configured to select and perform one of the scripted actions using the at least one robotic appendage based on data from the one or more sensors.

8. The apparatus of claim 1, wherein the action comprises one or more of:
the at least one robotic appendage opening a gate to enter a user's property;

the artificial body using the at least one robotic appendage to climb one or more stair steps to a user's residence;

the at least one robotic appendage ringing a doorbell associated with a door of a user; and shaking a hand of a user via the at least one robotic appendage.

9. The apparatus of claim 1, wherein the mounting interface is coupled to one or more of a hand portion and a chest portion of the artificial body.

10. The apparatus of claim 1, wherein the mounting interface comprises one or more of a magnetic interface, a mechanical clamp shaped to releasably receive the computing device, and a case for the computing device coupled to the artificial body.

11. The apparatus of claim 1, wherein the computing device comprises one or more of a flexible, curved, electronic display screen and an at least semi-transparent surface with a projector positioned to project an image onto a rear of the semi-transparent surface.

12. The apparatus of claim 1, wherein the computing device comprises a touchscreen, the touchscreen facing away from the artificial body in response to the mounting interface coupling the computing device to the artificial body, the computing device providing a user interface on the touchscreen.

13. The apparatus of claim 12, wherein the user interface comprises a document signature interface allowing a user to digitally sign an electronic document displayed on the touchscreen of the computing device.

14. The apparatus of claim 1, wherein the mounting interface comprises one or more electrical connections between the artificial body and the computing device, the one or more electrical connections comprising one or more of an electrical charging interface in electrical communication with a battery of the artificial body and an audio connection with one or more of an audio speaker and a microphone of the artificial body.

15. A system, comprising:
a computing device;
an artificial body shaped to represent at least a portion of a being and comprising at least one robotic appendage;
a mounting interface coupled to a face portion of the artificial body, the mounting interface removably coupling the computing device to the artificial body such that the computing device is selectively removable from the artificial body, the mounting interface compatible with various types of computing devices that are selectively removable from the mounting interface; and
a communication module configured to:
receive a live image or video of a remote user from a remote device communicatively coupled to the computing device;
display the live image or video of the remote user on the computing device that is removably coupled to the mounting interface on the face portion of the artificial body;
receive input from the remote device via a remote interface separate from the mounting interface and displaying a plurality of actions and an identification of a robotic appendage of the at least one robotic appendage configured to perform each action of the plurality of actions, the input comprising a selection of an action to be performed by the robotic appendage; and
actuate the robotic appendage to perform the action received from the remote device.

16. The system of claim 15, wherein the computing device comprises an electronic display configured to display a remote user from a different location than the artificial body to a local user within viewing proximity of the electronic display and wherein receiving the input from the remote device via the remote interface comprises receiving the input from the remote user.

17. The system of claim 16, further comprising a plurality of additional artificial bodies and mounting interfaces each removably coupling an additional computing device to the additional artificial bodies.

18. The system of claim 17, wherein the single remote user is selectively displayable on screens of each of the additional computing devices.

19. The system of claim 17, wherein screens of the additional computing devices each display different remote users.

20. An apparatus, comprising:
means for artificially representing at least a portion of a being, the being comprising at least one robotic appendage;
means for removably coupling a computing device to a face portion of the means for artificially representing at least a portion of a being such that the computing device is selectively removable from the means for artificially representing at least a portion of a being, the mounting interface compatible with various types of computing devices that are selectively removable from the mounting interface; and
means for receiving a live image or video of a remote user from a remote device communicatively coupled to the computing device; and
means for displaying the live image or video of the remote user on the computing device that is removably coupled to the mounting interface on the face portion of the artificial body;
means for receiving input from the remote device via a remote interface separate from the mounting interface and displaying a plurality of actions and an identification of a robotic appendage of the at least one robotic appendage configured to perform each action of the plurality of actions, the input comprising a selection of an action to be performed by the robotic appendage; and
means for actuating the robotic appendage to perform the action received from the remote device.

* * * * *